(12) United States Patent
Amante et al.

(10) Patent No.: US 11,821,235 B2
(45) Date of Patent: Nov. 21, 2023

(54) INTEGRATED DOOR HANDLE WITH HINGED ACCESS COVER

(71) Applicant: Bell Textron Inc., Fort Worth, TX (US)

(72) Inventors: William Anthony Amante, Grapevine, TX (US); Arunkumar Koppa Siddalingappa, Bangalore (IN); Darpan Bansal, New Delhi (IN); Timothy Brian Carr, Fort Worth, TX (US)

(73) Assignee: TEXTRON INNOVATIONS INC, Providence, RI (US)

( * ) Notice: Subject to any disclaimer, the term of this patent is extended or adjusted under 35 U.S.C. 154(b) by 424 days.

(21) Appl. No.: 16/915,429

(22) Filed: Jun. 29, 2020

(65) Prior Publication Data
US 2021/0363791 A1 Nov. 25, 2021

(30) Foreign Application Priority Data
May 21, 2020 (IN) .............................. 202021021436

(51) Int. Cl.
*E05B 85/10* (2014.01)
*B64C 1/14* (2006.01)
*E05B 17/18* (2006.01)
*E05B 1/00* (2006.01)
*E05B 85/00* (2014.01)

(52) U.S. Cl.
CPC .......... *E05B 85/103* (2013.01); *B64C 1/1446* (2013.01); *E05B 17/181* (2013.01)

(58) Field of Classification Search
CPC ............. Y10T 70/5761; Y10T 70/7955; Y10T 70/8649; Y10T 292/57; Y10T 292/82; Y10T 16/458; Y10S 292/31; Y10S 292/63; E05B 85/103; E05B 17/181; E05B 1/0015; E05B 5/006; E05B 1/00; E05B 1/0061; E05B 1/04; E05B 1/06; E05B 5/00;

(Continued)

(56) References Cited

U.S. PATENT DOCUMENTS 3,017,657 A * 1/1962 Mills ...................... E05B 1/0015
16/443
7,108,301 B2 * 9/2006 Louvel .................... E05B 81/78
292/201

(Continued)

FOREIGN PATENT DOCUMENTS

| CN | 204475988 U | * | 7/2015 | |
| WO | WO-2019120598 A1 | * | 6/2019 | ............ B60J 5/0468 |
| WO | WO-2019147757 A1 | * | 8/2019 | ............... E05B 1/04 |

*Primary Examiner* — Christine M Mills
*Assistant Examiner* — Christopher F Callahan
(74) *Attorney, Agent, or Firm* — Akona IP (57) ABSTRACT

A handle assembly for an access panel is described and includes a handle connected to a support structure integrated into and covered by a skin of the access panel, the handle comprising a grip portion and upper and lower flanges extending perpendicularly from the grip portion and having first ends connected to the grip portion and second ends connected to the support structure; and a cover disposed over an opening in the access panel skin and selectively transitionable between a closed position and an open position, the opening situated relative to the handle such that the handle is concealed when the cover is in a closed position and accessible via the opening when the cover is in an open position.

14 Claims, 7 Drawing Sheets

(58) Field of Classification Search
CPC ........ E05B 13/001; E05B 17/14; E05B 17/18;
E05B 85/10; E05B 85/14; E05B 85/16;
E05B 85/18; B64C 1/1446; B64C
29/0033; B64C 1/1461; B64C 1/00; B64C
1/0009; B64C 1/1407; B64C 1/14
USPC .......... 49/460, 503; 244/118.5, 129.4, 129.5,
244/130
See application file for complete search history.

(56) References Cited

U.S. PATENT DOCUMENTS

| | | | |
|---|---|---|---|
| 8,443,553 B1* | 5/2013 | Polewarczyk | E05B 85/107 |
| | | | 292/DIG. 31 |
| 10,920,449 B1* | 2/2021 | McDaniel | E05B 65/0025 |
| 2004/0012482 A1* | 1/2004 | Yamagishi | G07C 9/38 |
| | | | 340/5.53 |
| 2006/0010940 A1* | 1/2006 | Fu | G07C 9/33 |
| | | | 70/63 |
| 2014/0300115 A1* | 10/2014 | Vasi | E05B 85/103 |
| | | | 292/336.3 |
| 2015/0123409 A1* | 5/2015 | Lange | E05B 85/10 |
| | | | 292/336.3 |
| 2015/0315812 A1* | 11/2015 | Vasi | E05B 81/08 |
| | | | 292/336.3 |
| 2019/0234121 A1* | 8/2019 | Pudney | E05B 85/103 |
| 2019/0277055 A1* | 9/2019 | Rogel | E06B 3/4636 |
| 2019/0360234 A1* | 11/2019 | Alkoby | A47B 95/02 |
| 2021/0363779 A1* | 11/2021 | Bennett | E05B 1/0015 |
| 2021/0363780 A1* | 11/2021 | Amante | E05B 1/0015 |
| 2021/0363781 A1* | 11/2021 | Amante | E05B 1/0015 |
| 2021/0363782 A1* | 11/2021 | Amante | E05B 7/00 |

* cited by examiner

INTEGRATED DOOR HANDLE WITH HINGED ACCESS COVER

FOREIGN APPLICATION CLAIM OF PRIORITY

This application claims the benefit of priority under 35 U.S.C. 119(b) to Indian National Phase Patent Application Serial No. 202021021436 entitled, "INTEGRATED DOOR HANDLE WITH HINGED ACCESS COVER," filed on 21 May 2020. The disclosure of this prior application is considered part of (and is incorporated by reference in) the disclosure of this application.

TECHNICAL FIELD

This disclosure relates in general to the field of aircraft and, more particularly, though not exclusively, to a flush door handle assembly including an integrated door handle concealed by a hinged access cover for use in connection with such aircraft.

BACKGROUND

Aircraft typically have provided on exterior surfaces thereof doors or access panels for enabling access to an aircraft interior. Such doors or panels are often very large and therefore benefit from having handles disposed thereon to facilitate removal of the door/panel from and installation of the door/panel on the aircraft; however, handles on an exterior surface of an aircraft result inf added aerodynamic drag.

SUMMARY

One embodiment is a handle assembly for an access panel comprising a handle connected to a support structure integrated into and covered by a skin of the access panel, the handle comprising a grip portion and upper and lower flanges extending perpendicularly from the grip portion and having first ends connected to the grip portion and second ends connected to the support structure; and a cover disposed over an opening in the access panel skin and selectively transitionable between a closed position and an open position, the opening situated relative to the handle such that the handle is concealed when the cover is in a closed position and accessible via the opening when the cover is in an open position.

Another embodiment is an access panel comprising a support structure disposed proximate a side edge thereof; a skin covering a front surface of the access panel; a handle connected to the support structure integrated and covered by the access panel skin, the handle comprising a grip portion and upper and lower flanges extending perpendicularly from the grip portion and having first ends connected to the grip portion and second ends connected to the support structure; and a cover disposed over an opening in the access panel skin and selectively transitionable between a closed position and an open position, the opening situated relative to the handle such that the handle is concealed when the cover is in a closed position and accessible via the opening when the cover is in an open position.

Yet another embodiment is an aircraft comprising an access panel comprising a support structure disposed proximate a side edge thereof and a skin covering a front surface of the access panel; a handle connected to the support structure and covered by the skin of the access panel, the handle comprising a grip portion and upper and lower flanges extending perpendicularly from the grip portion and having first ends connected to the grip portion and second ends connected to the support structure; and a cover disposed over an opening in the access panel skin and selectively transitionable between a closed position and an open position, the opening situated relative to the handle such that the handle is concealed when the cover is in a closed position and accessible via the opening when the cover is in an open position.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a flush door handle assembly including integrated door handle integrated with a door or access panel (hereinafter collectively referred to as a "door") of an aircraft, for example, concealed by a hinged access cover. In accordance with features of embodiments described herein, the flush door handle is integrated into a side of the door and covered by an access cover attached to the skin of the aircraft with spring-loaded hinges that bias the access cover toward a closed position. The access door opens in response to a user's pushing the cover inward with his or her hand to expose the handle. Removal of the user's hand results in the cover returning to the closed position. The handle is integrated with the door structure to minimize weight and cost. Moreover, the simple design of the handle and access cover results in fewer part and less weight, as well as reduced installation time and cost. The design also minimizes aerodynamic drag when the aircraft is in flight and provides positive aesthetics due to the fact that the handle does not project outward from the aircraft door/fuselage. The design is modular and may be used for hold and maintenance requirements in addition to doors and access panels.

Figure 1:
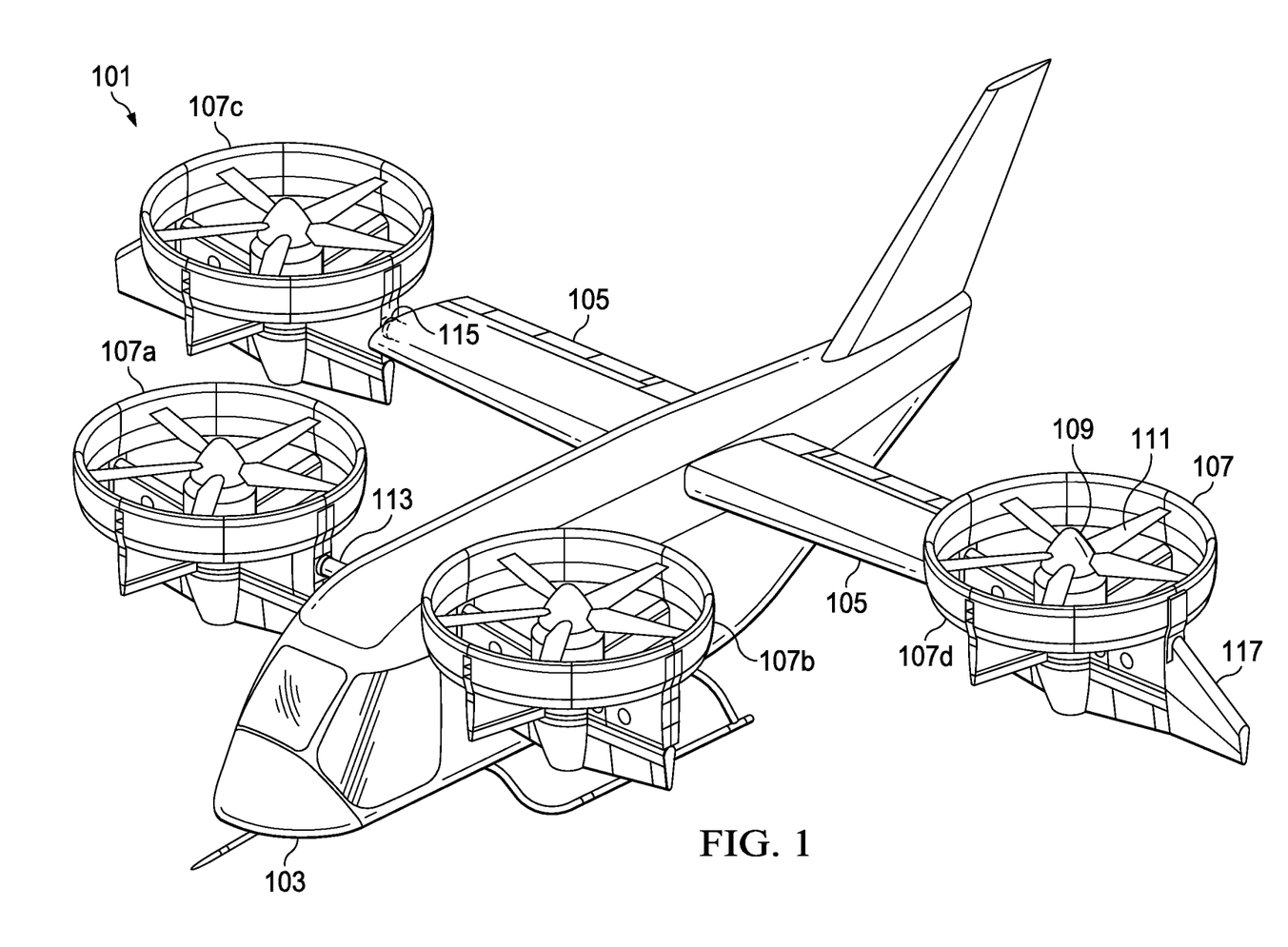
FIGS. 1 and 2 illustrate an example tiltrotor aircraft in which a flush door handle assembly including an integrated door handle concealed by a hinged access cover in accordance with embodiments described herein may be implemented and showing the aircraft configured to operate in a helicopter mode and an airplane mode, respectively.
Figure 2:
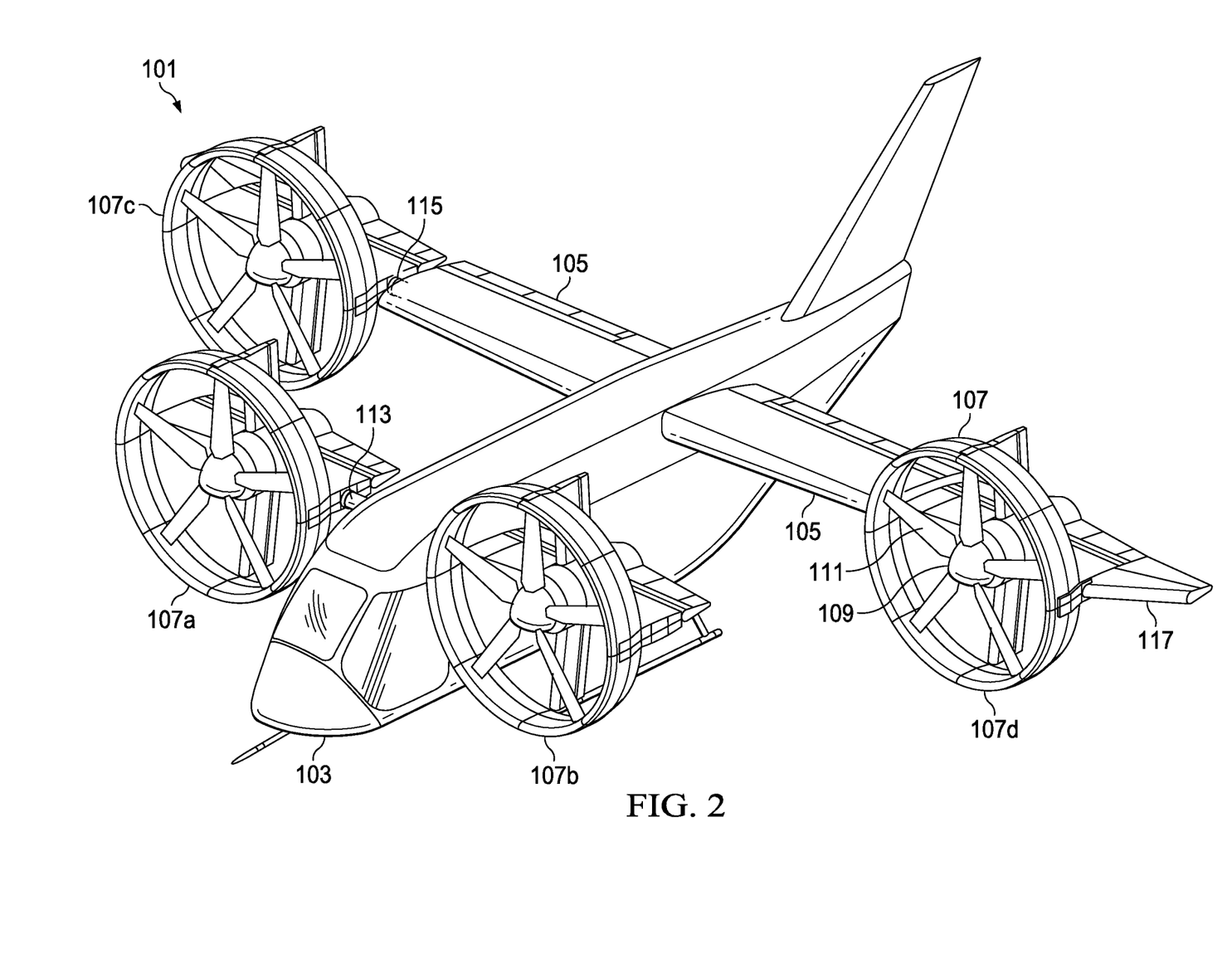

FIGS. 1 and 2 illustrate an example tiltrotor aircraft 101 that includes ducted rotors (or fans). The tiltrotor aircraft 101 is convertible between a helicopter mode (shown in FIG. 1), which allows for vertical takeoff and landing, hovering, and low speed directional movement, and an airplane mode (shown in FIG. 2), which allows for forward flight as well as horizontal takeoff and landing.

Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107.

In the illustrated embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a respective spindle 113. Ducts 107c and 107d are each independently coupled to a corresponding end of wing 105 via a respective spindle 115. As shown, each of ducts 107c and 107d includes a winglet 117 that is coupled thereto. It should be appreciated that aircraft 101 is not limited to the illustrated configuration having four ducts 107, and that aircraft 101 may alternatively be implemented with more or fewer ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight. In particular, in airplane mode, ducts 107 direct their respective thrusts in the aft direction to propel aircraft 101. Aircraft 101 is operable to fly in all directions during the vertical takeoff and landing (i.e., helicopter) mode configuration of FIG. 1, although faster forward flight is achievable while in the forward flight (i.e., airplane) mode configuration of FIG. 2. Ducted fans 107 may be tiltable between the vertical and horizontal positions by spindles 113, 115, which are rotatable in response to commands originating from a pilot and/or a flight control system of the aircraft 101.

Figure 3:
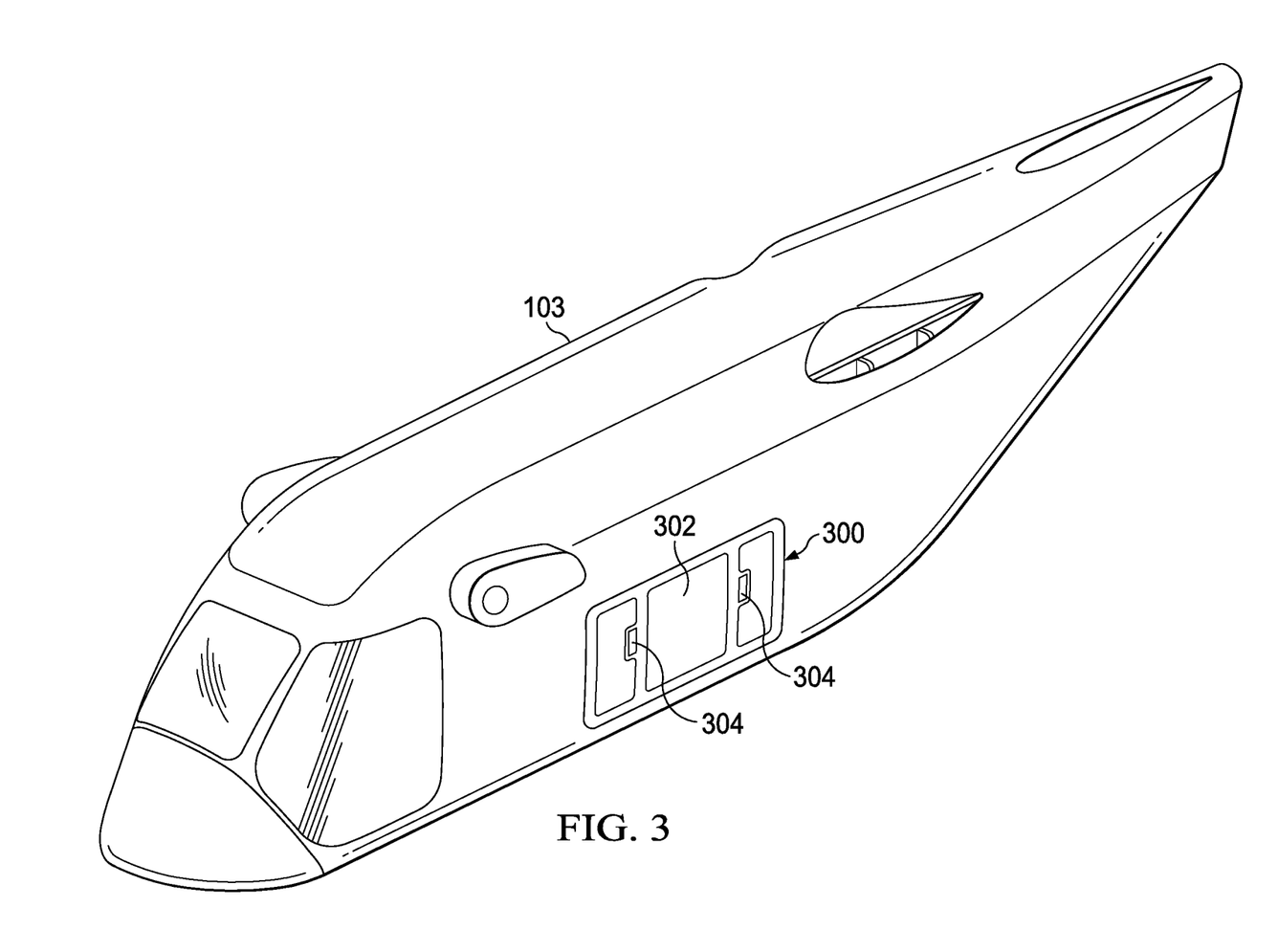
FIG. 3 is an illustration of the tiltrotor aircraft of FIGS. 1 and 2 with the wing and rotors removed to facilitate illustration and explanation of the flush door handle assembly including an integrated door handle concealed by a hinged access cover in accordance with embodiments described herein.

FIG. 3 illustrates the fuselage 103 of the aircraft 101 so that a door, or access panel, 300 is more clearly visible. In certain embodiments, door 300 covers an opening in skin 302 of the fuselage 103; therefore, removing the door 300 provides access to the opening and thus into the fuselage. It will be recognized that, although not shown in FIG. 3, aircraft 101 may be provided with additional doors for accessing areas of the aircraft internal to the fuselage 103, for example. As shown in FIG. 3, door 300 is provided with two flush door handle assemblies 304 embodying features that will be described in greater detail hereinbelow.

Figure 4:
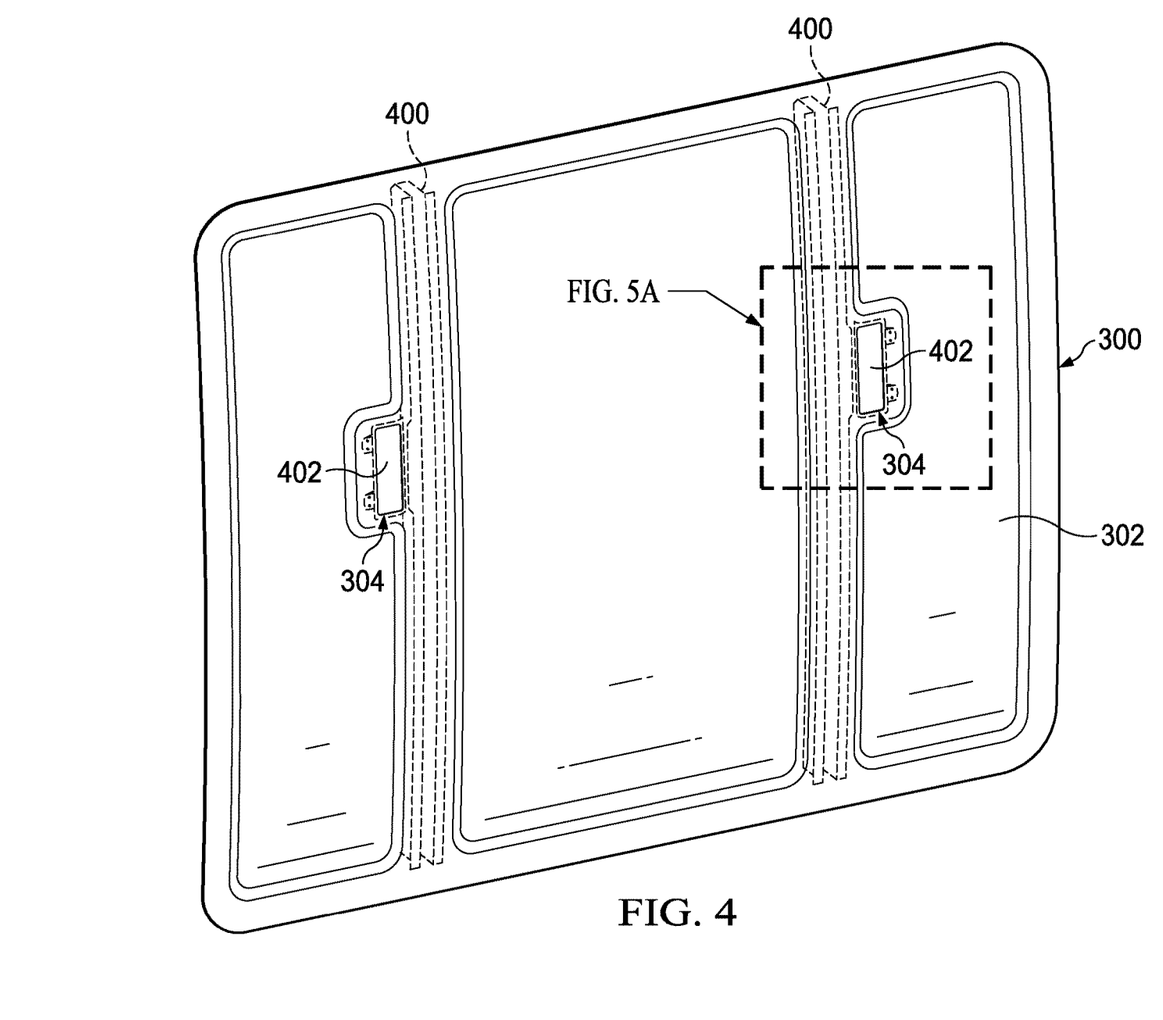
FIG. 4 illustrates a door panel for a tiltrotor aircraft to which a pair of flush door handle assembly including an integrated door handle concealed by a hinged access covers in accordance with embodiments described herein are connected.

FIG. 4 is a more detailed view of the door 300 with the door handle assemblies 304 attached. In one embodiment, as shown in FIG. 4, door 300 includes reinforcement channels 400 (in particular, C-channels) along opposite edges thereof. Channels 400 may be aluminum parts fabricated in a standard manner, for example, by extrusion or machining.

In accordance with features of embodiments descried herein, door handle assemblies 304 include covers 402 disposed over cavities on opposite sides of the door 300 for providing access to handles (not shown in FIG. 4) integrated into the reinforcement channels 400 within the cavities and concealed by covers 402, as will be described in greater detail below. Reinforcement channels 400 may be exposed or may be covered by door skin.

It will be recognized that, while handles are useful and/or necessary for removing the door 300 from the fuselage 103 and returning the door to the fuselage, during flight of the aircraft 101, handles result in aerodynamic drag. Therefore, the fact that handles may be selectively accessed and/or exposed for use when needed and easily stowed (or in this case, covered) as described below when not in use and/or when the aircraft 101 is in flight is highly beneficial.

Figure 5A:
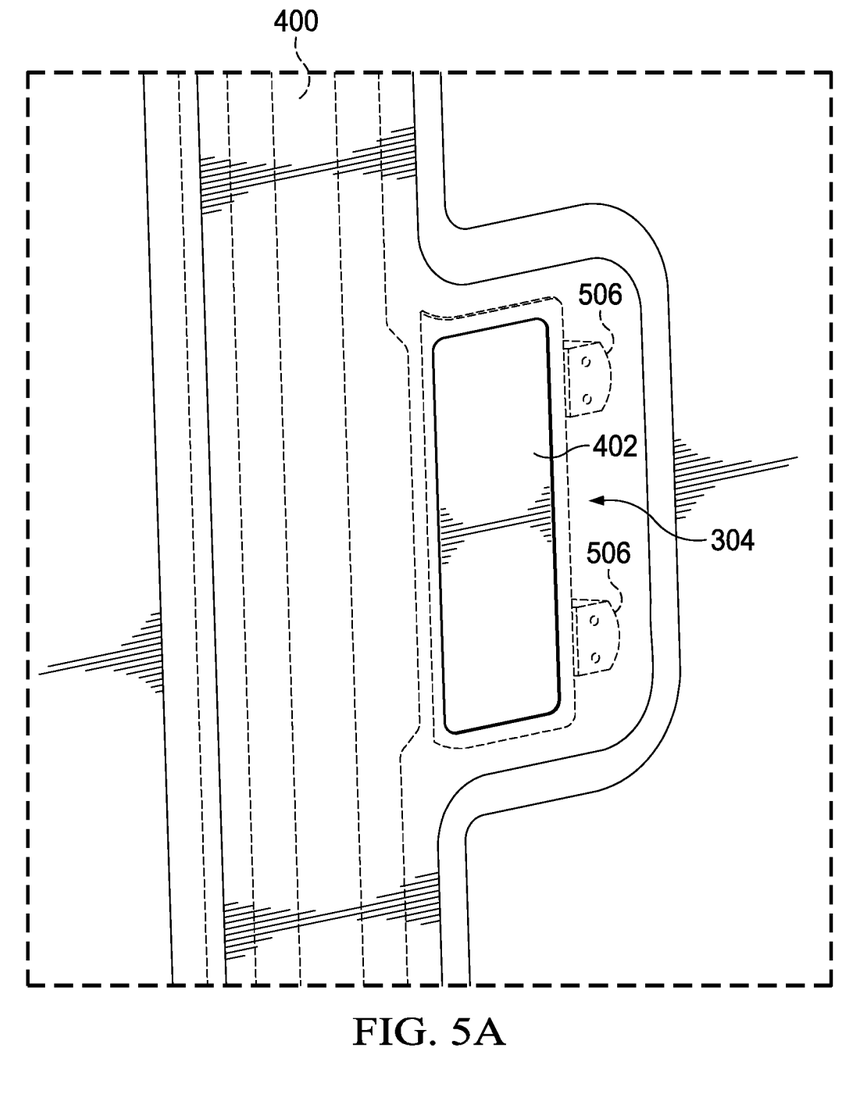
FIGS. 5A-5C illustrate more detailed views of the flush door handle assembly including an integrated door handle concealed by a hinged access cover in accordance with embodiments described herein.
Figure 5B:
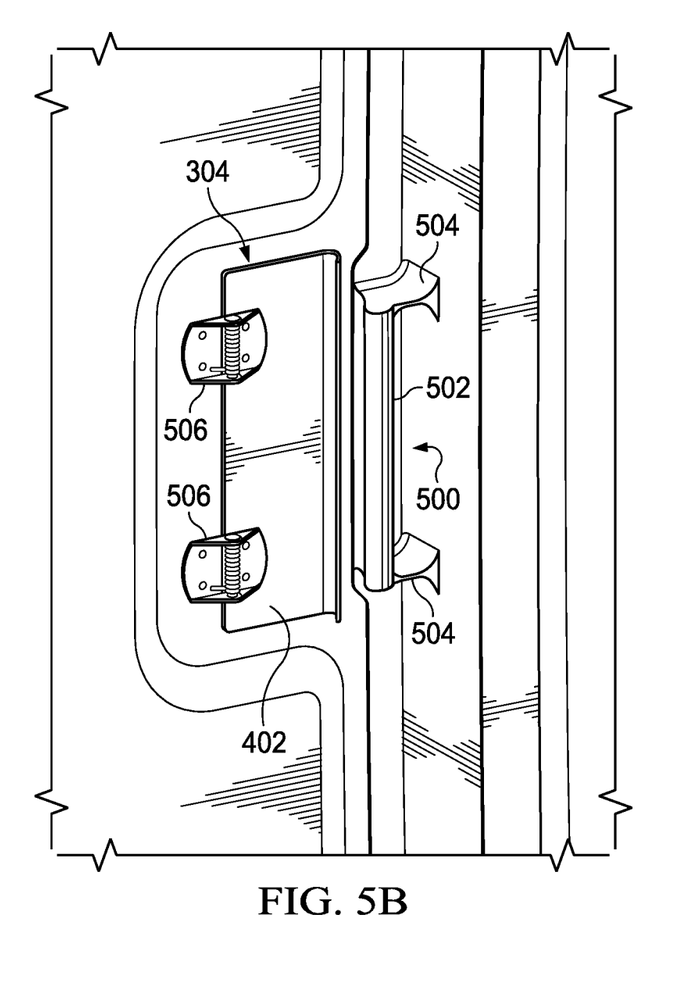
Figure 5C:
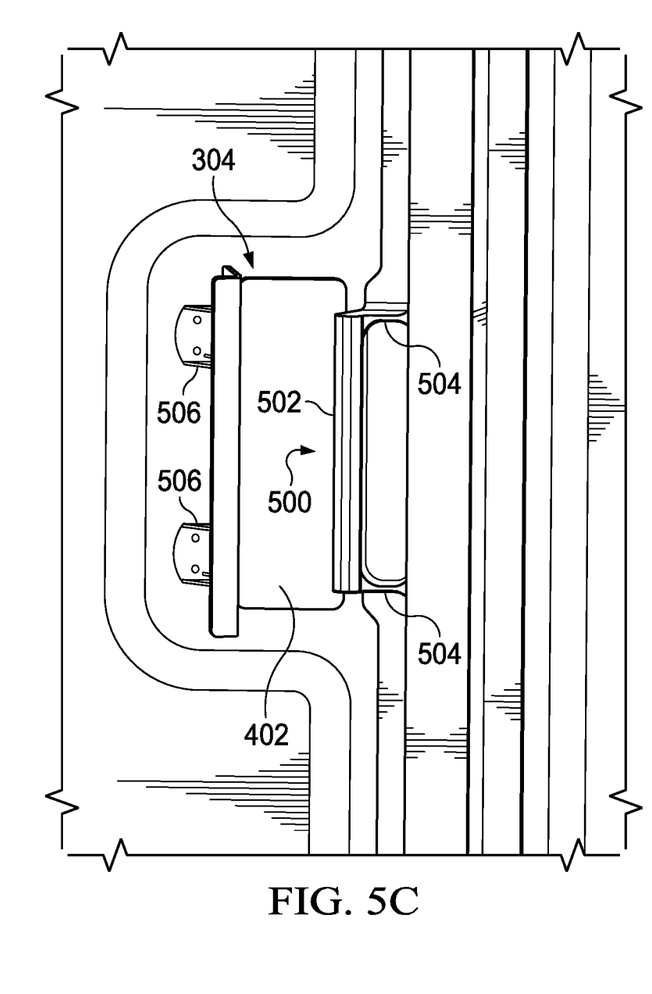
Figure 6A:
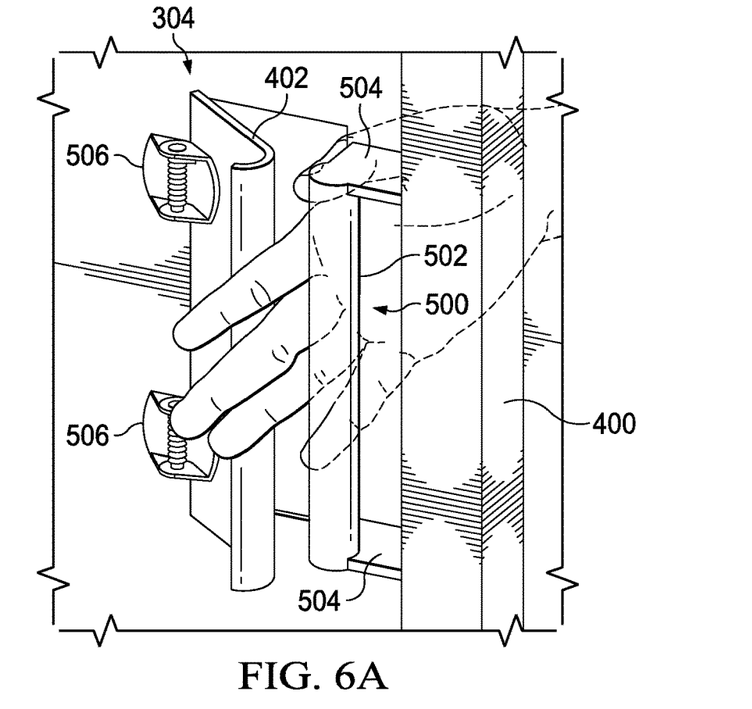
FIGS. 6A and 6B illustrate operation of the flush door handle assembly including an integrated door handle concealed by a hinged access cover in accordance with embodiments described herein.
Figure 6B:
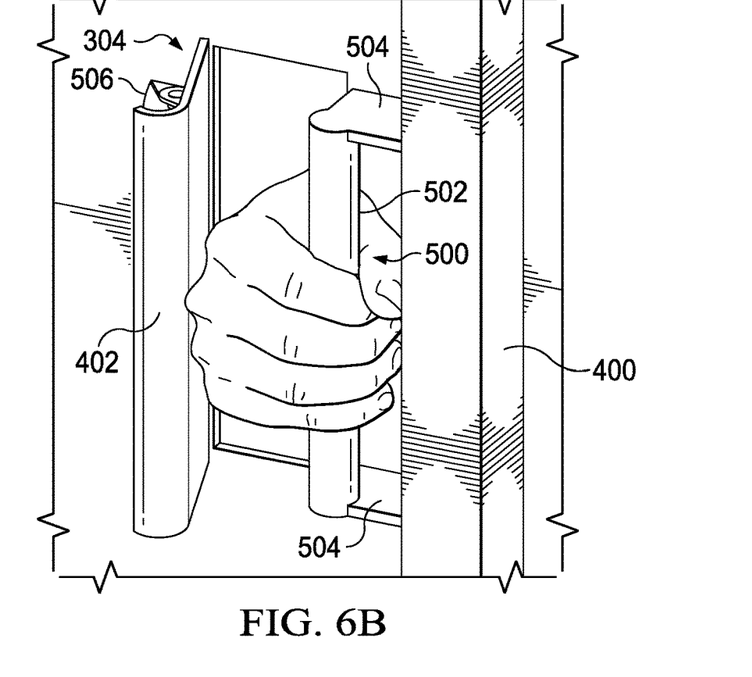

FIGS. 5A-5C are more detailed views of the door handle assembly 304 in accordance with features of embodiments described herein. In particular, FIG. 5A illustrates a view of the assembly 304 directed inboard from the exterior of the fuselage 103. FIGS. 5B and 5C respectively illustrate views of the assembly directed outboard from the interior of the fuselage 103; in FIG. 5B, the access cover 402 is closed, while in FIG. 5C, the access cover 402 is open. As best shown in FIGS. 5B and 5C, a handle 500 is disposed beneath the skin 302 of the fuselage 103 under the access cover 402 and is integrated into reinforcement channel 400. Handle 500 extends perpendicularly to a side of the door 300. In the illustrated embodiment, handle 500 includes an elongated grip portion 502 that may be grasped by a user during removal and/or installation of the door 300 and flanges 504 that are connected to or otherwise integrated with the reinforcement channel 400. Grip portion 502 may have an ergonomic design for facilitating a user's ability to securely grasp the handle 500, which in the illustrate embodiment extend perpendicularly to fore/aft sides of door 300. In accordance with features of embodiments described herein, access cover 402 is attached to the interior surface of the door skin via one or more spring loaded hinges 506 that bias the cover 402 closed, or outboard, (as shown in FIGS. 5A and 5B). The outboard force of the spring loaded hinges 506 may be overcome by a user's pressing against the outside surface of the cover 402, forcing the cover to rotate inboard to an open position (FIG. 5C) and allowing the user to grasp the exposed handle 500. Thereafter, the door 300 may be removed from the fuselage 103 as desired using the hand hold provided by the handles 500 with the back of the user's hands retaining the access covers 402 in an open position, as illustrated in FIGS. 6A and 6B.

It should be appreciated that aircraft illustrated herein, such as aircraft 101, is merely illustrative of a variety of aircraft that can implement the embodiments disclosed herein. Indeed, the various embodiments described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein can be integrated into a variety of aircraft configurations. It should be appreciated that even though aircraft are particularly well-suited to implement the embodiments of the present disclosure, non-aircraft vehicles and devices can also implement the embodiments.

The components of ducts 107, rotors 109, and rotors 111, for example, may comprise any materials suitable for use with an aircraft rotor, including, for example, carbon fiber, aluminum, steel, or titanium. While rotors 109 are shown as having four rotor blades 111, respectively, it should be understood that they may have as few as two rotor blades and may have more than four rotor blades.

Example 1 is a handle assembly for an access panel including a handle connected to a support structure integrated into and covered by a skin of the access panel, the handle comprising a grip portion and upper and lower flanges extending perpendicularly from the grip portion and having first ends connected to the grip portion and second ends connected to the support structure; and a cover disposed over an opening in the access panel skin and selectively transitionable between a closed position and an open position, the opening situated relative to the handle such that the handle is concealed when the cover is in a closed position and accessible via the opening when the cover is in an open position.

In Example 2, the handle assembly of Example 1 may further include the cover being connected to the access panel skin along an edge of the opening, In Example 3, the handle assembly of any of Examples 1 and 2 may further include the cover being connected to the access panel skin by at least one hinge.

In Example 4, the handle assembly of any of Examples 1-3 may further include the cover being selectively rotatable between the closed position and the open position.

In Example 5, the handle assembly of any of Examples 1-4 may further include the at least one hinge biasing the cover to the closed position.

In Example 6, the handle assembly of any of Examples 1-5 may further include the at least one hinge being disposed on the edge of the opening closest to an outer edge of the access panel.

In Example 7, the handle assembly of any of Examples 1-6 may further include the cover being transitionable from the closed position to the open position by applying pressure to a front surface of the cover and transitionable from the open position to the closed position by releasing pressure from the front surface of the door.

Example 8 is an access panel comprising a support structure disposed proximate a side edge thereof; a skin covering a front surface of the access panel; a handle connected to the support structure integrated and covered by the access panel skin, the handle comprising a grip portion and upper and lower flanges extending perpendicularly from the grip portion and having first ends connected to the grip portion and second ends connected to the support structure; and a cover disposed over an opening in the access panel skin and selectively transitionable between a closed position and an open position, the opening situated relative to the handle such that the handle is concealed when the cover is in a closed position and accessible via the opening when the cover is in an open position.

In Example 9, the access panel of Example 8 may further include the support structure comprising a c-channel.

In Example 10, the access panel of Example 9 may further include the cover being rotatably connected to the access panel skin via at least one hinge disposed along an edge of the opening.

In Example 11, the access panel of any of Examples 9-10 may further include the at least one hinge biasing the cover to the closed position.

In Example 12, the access panel of any of Examples 9-11 may further include the at least one hinge being disposed on the edge of the opening closest to an outer edge of the access panel.

In Example 13, the access panel of any of Examples 9-12 may further include the cover being transitionable from the closed position to the open position by applying pressure to a front surface of the cover and wherein the cover is transitionable from the open position to the closed position by releasing pressure from the front surface of the door.

Example 14 is an aircraft including an access panel comprising a support structure disposed proximate a side edge thereof; and a skin covering a front surface of the access panel; a handle connected to the support structure and covered by the skin of the access panel, the handle comprising a grip portion and upper and lower flanges extending perpendicularly from the grip portion and having first ends connected to the grip portion and second ends connected to the support structure; and a cover disposed over an opening in the access panel skin and selectively transitionable between a closed position and an open position, the opening situated relative to the handle such that the handle is concealed when the cover is in a closed position and accessible via the opening when the cover is in an open position.

In Example 15, the aircraft of Example 14 may further include the support structure comprising a c-channel.

In Example 16, the aircraft of any of Examples 14-15 may further include the cover being rotatably connected to the access panel skin along an edge of the opening by at least one hinge.

In Example 17, the aircraft of any of Examples 14-16 may further include the cover being selectively rotatable between the closed position and the open position.

In Example 18, the aircraft of any of Examples 14-17 may further include the at least one hinge biasing the cover to the closed position.

In Example 19, the aircraft of any of Examples 14-18 may further include the at least one hinge being disposed on the edge of the opening closest to an outer edge of the access panel.

In Example 20, the aircraft of any of Examples 14-19 may further include the cover being transitionable from the closed position to the open position by applying pressure to a front surface of the cover and the cover being transitionable from the open position to the closed position by releasing pressure from the front surface of the door.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A handle assembly for an access panel comprising:
   a handle fixedly and immovably connected to a support structure integrated into and covered by a skin of the access panel, the handle comprising:
      a grip portion; and
      upper and lower flanges extending perpendicularly from the grip portion and having first ends connected to the grip portion and second ends connected to the support structure; and
   a cover disposed over an opening in the access panel skin and selectively transitionable between a closed position and an open position without use of electronics, the opening situated relative to the handle such that the handle is concealed when the cover is in the closed position and accessible via the opening when the cover is in the open position;
   wherein the cover is selectively rotatable between the closed position and the open position; and
   wherein the cover is transitionable from the closed position to the open position by a user's applying contact pressure to a front surface of the cover and wherein the cover is transitionable from the open position to the closed position by the user's releasing contact pressure from the front surface of the cover.

2. The handle assembly of claim 1, wherein the cover is connected to the access panel skin along an edge of the opening.

3. The handle assembly of claim 2, wherein the cover is connected to the access panel skin by at least one hinge.

4. The handle assembly of claim 3, wherein the at least one hinge biases the cover to the closed position.

5. The handle assembly of claim 3, wherein the at least one hinge is disposed on the edge of the opening closest to an outer edge of the access panel.

6. An access panel comprising:
   a support structure disposed proximate a side edge thereof;
   a skin covering a front surface of the access panel;
   a handle connected to the support structure integrated and covered by the access panel skin, wherein the handle is fixed and immovable relative to the support structure and comprises:
      a grip portion; and
      upper and lower flanges extending perpendicularly from the grip portion and having first ends connected to the grip portion and second ends connected to the support structure; and
   a cover disposed over an opening in the access panel skin and selectively transitionable between a closed position and an open position without use of electronics, the opening situated relative to the handle such that the handle is concealed when the cover is in the closed position and accessible via the opening when the cover is in the open position;
   wherein the support structure comprises a c-channel; and
   wherein the cover is transitionable from the closed position to the open position by a user's physically contacting a front surface of the cover and applying direct pressure thereto and wherein the cover is transitionable from the open position to the closed position by the user's ceasing contact with the front surface of the cover.

7. The access panel of claim 6, wherein the cover is rotatably connected to the access panel skin via at least one hinge disposed along an edge of the opening.

8. The access panel of claim 7, wherein the at least one hinge biases the cover to the closed position.

9. The access panel of claim 7, wherein the at least one hinge is disposed on the edge of the opening closest to an outer edge of the access panel.

10. An aircraft comprising:
    an access panel comprising:
       a support structure disposed proximate a side edge thereof; and
       a skin covering a front surface of the access panel;
       a non-rotating and immovable handle connected to the support structure and covered by the skin of the access panel, the handle comprising:
       a grip portion; and
       upper and lower flanges extending perpendicularly from the grip portion and having first ends connected to the grip portion and second ends connected to the support structure; and
    a cover disposed over an opening in the access panel skin and selectively transitionable between a closed position and an open position without use of electronics, the opening situated relative to the handle such that the handle is concealed when the cover is in the closed position and accessible via the opening when the cover is in the open position;
    wherein the cover is rotatably connected to the access panel skin along an edge of the opening by at least one hinge; and
    wherein the cover is transitionable from the closed position to the open position by a user's applying contact pressure to a front surface of the cover and wherein the cover is transitionable from the open position to the closed position by the user's releasing contact pressure from the front surface of the cover.

11. The aircraft of claim 10, wherein the support structure comprises a c-channel.

12. The aircraft of claim 11, wherein the cover is selectively rotatable between the closed position and the open position.

13. The aircraft of claim 11, wherein the at least one hinge biases the cover to the closed position.

14. The aircraft of claim 11, wherein the at least one hinge is disposed on the edge of the opening closest to an outer edge of the access panel.

* * * * *